(12) United States Patent
Chen

(10) Patent No.: US 7,957,845 B2
(45) Date of Patent: Jun. 7, 2011

(54) APPARATUS AND METHOD FOR PREDICTIVE CONTROL OF A POWER GENERATION SYSTEM

(75) Inventor: Dingguo Chen, Eden Prairie, MN (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 12/693,487

(22) Filed: Jan. 26, 2010

(65) Prior Publication Data

US 2010/0114393 A1    May 6, 2010

Related U.S. Application Data

(62) Division of application No. 11/714,647, filed on Mar. 6, 2007, now Pat. No. 7,660,640.

(60) Provisional application No. 60/780,136, filed on Mar. 8, 2006, provisional application No. 60/779,845, filed on Mar. 7, 2006.

(51) Int. Cl.
*G05D 3/12* (2006.01)
*G05B 11/01* (2006.01)
*G05B 13/02* (2006.01)

(52) U.S. Cl. .............. 700/286; 700/14; 700/16; 700/22; 700/28; 700/51; 700/297

(58) Field of Classification Search .................... 700/14, 700/16, 22, 28–37, 44, 45, 51, 54, 55, 286, 700/287, 289, 290, 297, 298; 703/2, 18; 702/179–182
See application file for complete search history.

(56) References Cited

U.S. PATENT DOCUMENTS

| | | | |
|---|---|---|---|
| 3,932,735 A * | 1/1976 | Giras | 700/287 |
| 6,278,899 B1 | 8/2001 | Piche et al. | |
| 7,117,046 B2 * | 10/2006 | Boyden et al. | 700/52 |
| 7,778,737 B2 * | 8/2010 | Rossi et al. | 700/295 |
| 2004/0249775 A1 | 12/2004 | Chen | |
| 2004/0257059 A1 | 12/2004 | Mansingh et al. | |
| 2004/0257858 A1 | 12/2004 | Mansingh et al. | |
| 2004/0260430 A1 | 12/2004 | Mansingh et al. | |
| 2004/0260489 A1 | 12/2004 | Mansingh et al. | |
| 2006/0041405 A1 | 2/2006 | Chen et al. | |

OTHER PUBLICATIONS

Yao, Maojun; "AGC Logic Based on NERC's New Control Performance Standard and Disturbance Control Standard"; IEEE Transactions on Power Systems; May 2000; pp. 852-857; IEEE Power Engineering Society; vol. 15, No. 2; Ames, Iowa, USA.

* cited by examiner

*Primary Examiner* — Sean P Shectman

(57) ABSTRACT

A method for controlling a power system control area according to a first and a second control performance standard, wherein operation of the control area determines area control parameter values. The method comprises (a) determining a first compliance target for the first performance standard and a second compliance target for the second performance standard (100/200); (b) determining a first performance standard statistical measure responsive to the control area parameter values from a beginning of a first compliance period to a time at which the first average is determined (108); (c) determining a second performance standard statistical measure responsive to the control area parameter values from a beginning of a second compliance period to a time at which the second average is determined; (d) determining a first area control parameter target responsive to the first performance standard statistical measure (116); (e) determining a second area control parameter target responsive to the second performance standard statistical measure (204); (f) determining a first area control parameter correction responsive to the first area control parameter target and the area control parameter values (150); (g) determining a second area control parameter correction responsive to the second area control parameter target and the area control parameter values (228) and (h) controlling the power system according to one or both of the first and the second area control parameter corrections (154/232).

11 Claims, 3 Drawing Sheets

APPARATUS AND METHOD FOR PREDICTIVE CONTROL OF A POWER GENERATION SYSTEM

This is a divisional application of U.S. patent application Ser. No. 11/714,647, filed Mar. 6, 2007 now U.S. Pat. No. 7,660,640. The present application claims the benefit under Section 119(e) of the provisional patent application filed on Mar. 8, 2006 and assigned application No. 60/780,136, and also of the provisional patent application filed on Mar. 7, 2006 and assigned application No. 60/779,845.

FIELD OF THE INVENTION

The present invention relates generally to control of a power generation/load management system and more specifically to predictive control of the power generation/load management system responsive to certain control performance standards.

BACKGROUND OF THE INVENTION

The electrical power system (grid) includes generating sites, transmission lines, distribution equipment and end uses (loads). The electricity is generated competitively at multiple power plants and transmitted from the generating sites over the transmission lines regulated by the Federal Energy Regulatory Commission (FERC). Generation and transmission of the electricity are usually managed and controlled by regional entities that monitor generating capacity, real-time generation and loads, grid operations, market operations (buying and selling of electricity and delivery of the electricity to the buying party), system security and other aspects of the electric power system. There are a number of organizations responsible for overseeing power generation, transmission and distribution activities. Such controlling organizations include regional independent system operators (ISOs), regional transmission organizations (RTOs), reliability coordinators and utility companies. The transmission lines, which may be located in different states, are typically owned by an electric utility or a transmission company.

For safe and efficient operation of the power system, the generated electricity must instantaneously and continuously match the electrical load (i.e., the consumption and generation must be held in balance). Further the grid alternating current frequency (and thus the frequency of each generating unit) must be maintained within a very narrow range around 60 Hz. Excess generation causes the system frequency to increase while deficit generation causes the frequency to decrease. Although it is impossible to maintain a perfect generation and load balance, active control systems attempt to do this by constantly adjusting the power output of the generators. In addition to load imbalance, system frequency deviations from 60 Hz may also be caused by generators that are not properly meeting their desired generation targets, leading to over-generation or under-generation.

Small frequency deviations (e.g., less than about ±0.05 Hz) do not degrade system reliability or market efficiency (the buying and selling of electricity and transmission of the electricity over transmission lines connecting the generator to the load). Large frequency deviations from the nominal 60 Hz (e.g., 0.1 Hz), such as caused by the sudden loss of a generator can damage generation, transmission and load equipment, degrade product quality (causing lights to flicker, for example), collapse the power system (by triggering protective system actions, for example) and overload transmission lines as the remaining generators supply additional electricity to those lines in an attempt to restore the system frequency. Although the power system is designed to quickly recover from the loss of a generator, recovery typically takes several minutes. For example, the loss of a 2600 MW generator in a relatively small grid causes the frequency to drop by about 0.08 Hz and recover in about 10 minutes. Recovery is typically accomplished by tripping generators off line to overcome an over-frequency condition and shedding load to overcome an under frequency condition The power system is divided into control areas (there are approximately 153 control areas (CAs) in the United States) with each control area exercising some control over the system frequency. An inter-area control system, referred to as an area generation control system ensures that all areas cooperate to control the system frequency. An area control error (ACE), computed for each area within the AGC system indicates the amount of frequency control coordination that a control area is required to contribute to the inter-area system. Use of the ACE spreads the economic burden of frequency control to all participating generators in all control areas. System reliability is thereby enhanced by avoiding reliance on a few generators for system frequency control, improving the system's ability to respond to transient conditions. The ACE value provides a technique to balance frequency maintenance across the entire system.

A frequency bias term is added to the ACE balancing equation to refine frequency control. The nominal target frequency is periodically increased or decreased by about 0.02 Hz to adjust the long term average frequency. Under normal operating conditions the frequency is controlled very tightly.

Balancing aggregate load with aggregate generation in a control area is accomplished through several services that are distinguished by the time frame over which they operate. Under normal operating conditions (i.e., no system disturbances) these services include regulation and load following. Regulation uses on-line generation capacity or stored capacity that is equipped with automatic generation control (AGC) that can change output quickly to compensate for minute-to-minute fluctuations in area load and unintended fluctuations in generation. A typical large fossil-fired plant thermal generator may be able to ramp 1% of its capacity in one minute. Smaller units can and combustion turbines can ramp faster. Loads are controlled by a load shedding function that can shed or restore loads as desired.

Load following uses on-line generation, stored capacity or load shedding equipment to compensate for the inter-hour and intra-hour load ramping. The regulation and load following differ only in the time period over which they operate.

Control area operators are not required to specifically procure load following generation. Instead, the required generation is procured in the short term energy market responsive to the real time energy prices and expected loads. Regulation, however, requires faster response than obtainable from units responding solely to market conditions, Instead, generators (and potentially energy storage units) offer capacity that can be controlled by the system operator's AGC system to balance the system's generation and load.

The control area operator is responsible for controlling its generating units. The AGC system calculates the control command for each generating unit (that is, each generating unit that is under AGC control) and issues the control signal to the generating unit on a per AGC control cycle basis. The AGC control cycle is the rate at which control signals are issued to the generating units. Typically the control cycle is four seconds, but it can be as short as two seconds or as long as five seconds. Thus the AGC system regulates the power output of the control area electric generators in response to changes in system frequency, loading on the interconnected system and the relation of these two parameters. The AGC system attempts to maintain the scheduled system frequency and established power interchange with other control areas, within predetermined limits. The AGC system monitors and controls power generation with the objectives of minimizing ACE, minimizing operating costs, maintaining generation at fixed (base load) values, maintaining net interchange power to the scheduled interchange power, maintaining actual system frequency at the scheduled frequency, and providing for ramp generation in a linear fashion according as scheduled.

Each control area is not able and not required to perfectly match generation and load. Generating an amount of electricity that is in exact equilibrium with the load is extremely difficult and impractical. Instead, control area operators strive to continually alternate between over and under generation. For example, a control area may impose a target of crossing the break even point (i.e., a zero ACE value) fifteen times per hour.

The North American Electric Reliability Council (NERC) has established rules governing how well each control area must balance load and generation. Control performance standards 1 and 2 (CPS 1 and 2) establish statistical limits on how well each control area must balance minute-to-minute fluctuations without degrading system reliability, where the system comprises multiple interconnected control areas. Since a balanced total system is desired, when one control area fails to balance its load and generation, generation in another control area provides the required balancing energy.

CPS1 and CPS2 are standards that measure overall control area performance. CPS1 measures the relationship between the control area's ACE and the system (i.e., interconnected control areas) frequency on a one-minute average basis for the previous eleven months back from the current minute (i.e., a rolling average). When the current minute is the last minute of the calendar month, the CPS1 indicates the relationship for the previous eleven months plus the current month now ended. The twelve month moving window period includes the current month (to the last day and minute of the current month) and the previous eleven months. Each month refers to an entire calendar month, that is, from the first day of a month to the last day of the same month. For example, if the current date is Mar. 5, 2007, the twelve month period runs from Apr. 1, 2006 00:00:00 to Mar. 31, 2007 23:59:59.

CPS1 represents a correlation of the clock-minute frequency deviation average (where clock-minute average refers to the average of all the instantaneous values (e.g., one measured or telemetered instantaneous value every four seconds) during a clock minute) and the clock-minute ACE average over a rolling 12 month period. When the system frequency is above its reference, under generation benefits the system (interconnected control areas) by lowering the system frequency and improves the CPS1 value. Over generation at such times, however, tends to worsen the CPS1 value. Thus CPS1 distinguishes between generation/load imbalances that help to restore the system frequency (a favorable CPS1 value) and those that degrade the system frequency (an unfavorable CPS1 value). The component parameters of CPS1 are determined every minute but the CPS1 values is evaluated and reported on a 12 month rolling average basis. NERC regulations require that each control area must be no less than 100% compliant with CPS1.

CPS2, a monthly performance standard, sets specific control area limits on the maximum ACE for every real time (clock time) 10 minute period. Control areas are permitted to exceed the CPS2 limit no more than 10% of the time, that is, a 90% compliance with the CPS2 value is required. Thus a control area can have no more than an average of about 14.4 CPS2 violations per day during each month. The CPS2 reference to the current month means a calendar month, Mar. 1, 2007 00:00:00 to Mar. 31, 2007 23:59:59.

There is a need for a method and system that reduces the risk of non-compliance with the CPS1 and CPS2 control performance standards set by regulatory authorities such as NERC.

BRIEF DESCRIPTION OF THE INVENTION

According to a first embodiment, the invention comprises a method for controlling a power system control area according to a control performance standard, wherein operation of the control area determines area control parameter values and control performance standard values. The method comprises (a) determining a control performance standard compliance target, (b) determining an average control performance standard responsive to the control performance standard values from a beginning of a compliance period to a time t at which the average is determined, (c) determining an area control parameter target responsive to the average control performance standard, (d) determining a relationship between the area control parameter values and the area control parameter target over a prior time interval, (e) determining an area control parameter correction responsive to the relationship determined at a step (d), (f) controlling the power system control area responsive to the area control parameter correction and (g) periodically repeating steps (b)-(f) until an end of the compliance period.

According to another embodiment, the invention comprises an apparatus for controlling a power system control area according to a first and a second control performance standard. The apparatus comprises a data base for storing area control parameter values determined from operational parameters of the power system control area, a first module for determining a first measure of a first control performance standard responsive to the operational parameters from a beginning of a first compliance period to the time at which the first measure is determined, a second module for determining a second measure of a second control performance standard responsive to the operational parameters from a beginning of a second compliance period to the time at which the second measure is determined, a third module for determining a first area control parameter target responsive to the first measure and to a compliance target for the first control performance standard, and for determining a second area control parameter target responsive to the second measure and to a compliance target for the second control performance standard, a fourth module for determining a first area control parameter correction responsive to a first area control parameter target and the area control parameter values and for determining a second area control parameter correction responsive to the second area control parameter target and the area control parameter values and a fifth module for controlling the power system control area according to one or both of the first and the second area control parameter corrections.

BRIEF DESCRIPTION OF THE DRAWINGS

The invention is explained in the following description in view of the drawings that show.

DETAILED DESCRIPTION OF THE INVENTION

Figure 1:
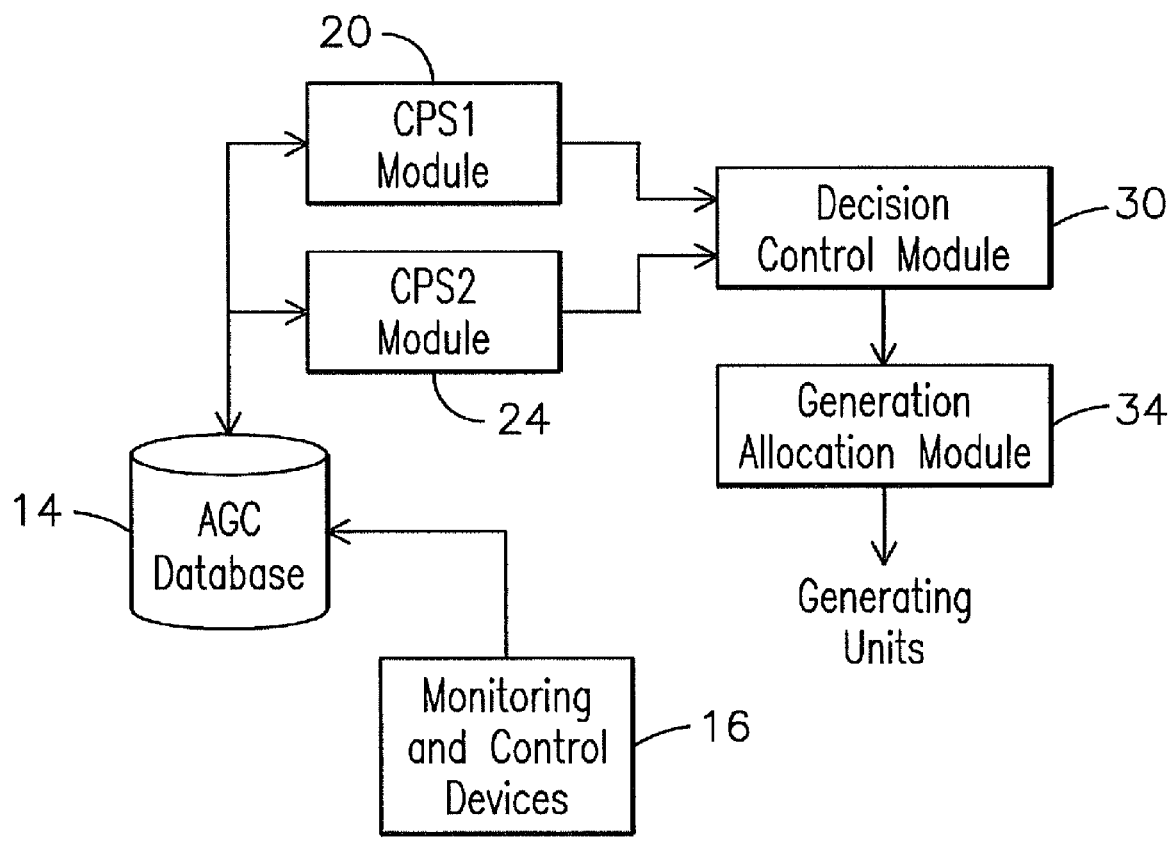
FIG. 1 is a block diagram of elements of a power system to which the teachings of the present invention can be applied.

Before describing in detail the methods and apparatuses related to predictive control of a power generation system, it should be observed that the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

System operators (ISOs) are challenged to readily match changes in load requirements with power generation for their control areas. Currently, ISOs operate the system by reacting to power trends as well as scheduled power interchanges with other areas. The ISO's are responsible for managing the appropriate energy markets, typically including the day-ahead market, the hour-ahead market and the real-time market to ensure that the system required energy and ancillary services (energy regulation, spinning reserve, non-spinning reserve, load following, reactive power reserve, etc.) are procured through the market mechanisms and the most economic dispatch instructions are provided to all participating market resources so that the overall system production cost is minimized and all market participants are sharing the benefit of the competitive market.

Each control area within an ISO-governed region must ensure that it has sufficient power generation capacity, regulation capacity, spinning reserve capacity, etc. to serve its own load requirements before selling its excess capacity on the market. As such, some of the generating resources of the control area need to follow the ISO's economic dispatch instructions. However, the control area is still responsible for controlling its generating units to meet the CPS1 and CPS2 control performance criteria.

The control area operators provide regulatory agencies with schedule information detailing the amount and time interval over which the energy will be produced. These schedules vary over the course of a year, month, week, day and hour. Seasonal variations and special days such as holidays and weekends also affect the amount of energy generation. Despite knowing that such energy requirements vary considerably at times, operators are tasked with the burden of meeting demand for real-time and unanticipated energy shortages.

The automatic generation control (AGC) systems attempt to control this mismatch between sources of power and loads by balancing real-power and by stabilizing frequency. As a guide to power and load management, NERC promulgates the CPS1 and 2 standards that each control area must satisfy, i.e., 100% compliance for CPS1 and 90% compliance for CPS2, to minimize adverse effects on neighboring control areas of the interconnection system.

Notwithstanding the CPS1 and CPS2 compliance requirements, a control area operator can establish a different CPS1 or CPS2 target to tighten or loosen control of its generating units depending on whether its actual to-date CPS1 and CPS2 performance statistics are below or above the NERC mandated compliance targets. Such actions may reduce generating unit costs, for example, but excessive control loosening may also create a substantial risk of missing the compliance target at the end of the compliance period. Tightening control of the generators may ensure compliance at the end of the period, but excessive tightening may needlessly increase costs. It would be advantageous for the control area operators to determine, in a quantitative sense, the degree to which control over the generating units can be tightened or loosened. The teachings of the invention provide such a quantitative measure, thus permitting more precise generator control without risking non-compliance.

As a measure of conformity to the control performance standards, the area control error (ACE) factor is determined for a control area as an overall indicator of how well the system frequency and the control area's net power interchange are controlled. For purposes of illustration, the ACE equation is shown below in a slightly simplified form:

$$ACE = (I_A - I_S) - 10B(F_A - F_S) \qquad (1)$$

where I is the algebraic sum of incoming and outgoing power flows (in MW) on interconnection tie-lines (also referred to as interconnects or inter-ties) between a control area and its surrounding control areas, F is the interconnection frequency (in Hz), the subscript A denotes actual power/frequency, the subscript S denotes scheduled power/frequency and B (a negative number) is the control area's frequency bias (in MW/0.1 Hz). The frequency bias factor B is the amount of generation needed to respond to a 0.1 Hz change in interconnection frequency. It normally equals the supply-plus-load response of a control area to a change in interconnection frequency.

Since multiple control areas are connected to each other through the inter-ties, there is a single frequency that is universal to all the control areas within the interconnected system or interconnection, referred to as the interconnection frequency. Thus any power output change of any generating unit for any control area within the interconnection system impacts the interconnection frequency.

The first parenthetical term in equation (1) indicates control area performance in matching its scheduled net interchange power flow with its actual interchange power flow. The second term measures the effect of maintaining the interconnect frequency at its scheduled value. The effects represented by these two terms are independent. ACE measures how well a control area manages its generation to match time-varying loads and scheduled interchange power flows and frequency variations from the scheduled frequency.

As a further guide to performance, NERC has defined the minimum control performance standards, CPS1, CPS2 and DCS to allow the power utilities to relax control of their generating units, minimizing unit wear and tear and prolonging unit life span. The DCS parameter refers to a disturbance control standard that is not relevant to the present invention. CPS1 is defined by and satisfied if the following inequality is true:

$$CPS1 = AVG_{12\text{-}month}\left[\left(\frac{ACE_i}{-10B_i}\right)_i \Delta F_i\right] \leq \varepsilon_i^2$$

or equivalently, $$CPS1 = \left(2 - AVG_{12\text{-}month}\left[\left(\frac{ACE_i}{-10B_i}\right)_i \Delta F_i\right] \Big/ \varepsilon_i^2\right) \times 100\% \geq 100\% \qquad (2)$$

where $AVG_{12\text{-}month}$ is the rolling twelve month average (including the previous eleven months and the current month to the current minute) of the bracketed parameter;

$ACE_i$ is the current clock-minute average ACE value;

$B_i$ is the current clock-minute frequency bias value for the control area in MW/0.1 Hz (this parameter converts Hz in the ΔF term to MW for units consistency with the ACE value in MW)

$\epsilon_i$ is the interconnections' targeted frequency bound in Hz; and $\Delta F_i$ is the current clock-minute average frequency deviation in Hz.

Generally, the subscript i refers to a clock-minute average, where clock-minute average refers to the average of all the instantaneous values (e.g., one measured or telemetered value every four seconds, for a four second AGC cycle) that are measured during a clock minute, that is from the first second of a clock minute to the last second of the same clock minute, e.g., from 00:30:00 to 00:30:59.

In short, CPS1 measures the relationship between ACE and the interconnection frequency on a one-minute or clock minute average basis for a rolling twelve month period to the last minute of the current month. Since the CPS1 criteria is a statistical value averaged over a period of 12 months (the previous eleven months plus the current month), according to the prior art the CPS1 value is calculated in non-real-time to determine historical compliance performance.

The present invention teaches a method, system and computer software product for automatic generation control using predicted CPS1 values (and CPS2 values as further described below) to ensure compliance with the CPS1 and CPS2 standards at the end of their respective compliance periods.

In one application of the predictive CPS1 control of the present invention, a first memory that stores the historical performance data required to calculate CPS1 has a time delay of about 10 minutes. Using this stored data, in the worst-case scenario the historical performance data required to calculate CPS1 is updated up to 20 minutes or less back from the current minute. The resulting calculated CPS1 value (absent performance information for the immediately previous 20 minutes) is referred to as historical compliance performance data.

A software application that determines the AGC control signal tracks and stores instantaneous performance data in a second memory, including data for at least 20 minutes prior to the current minute. The historical performance data in the first memory and the performance data in the second memory can be used to calculate the CPS1 value for the previous 12-month time period up to the current minute.

Using the historical performance data and performance data up to the current minute, in one embodiment a software application determines the CPS1 value every minute (for example; other time intervals can be used as desired). Since the CPS1 value represents an average, each calculated CPS1 value indicates whether the historical performance to the current minute is better or worse than the mandated compliance value. If the CPS1 value is substantially above the required compliance value, AGC control can be relaxed for the rest of the current month. Since the generating units are controlled less frequently responsive to a relaxed AGC, the number of generator reversals is reduced, (a generating unit reversal refers to a control command to move the unit up/down at the last AGC control cycle followed by a control command to move the unit down/up at this AGC control cycle, i.e., unit movement changes direction over two consecutive AGC control cycles) generator wear and tear is reduced, the unit life span is extended and maintenance costs are minimized. However, excessive control relaxation may result in non-compliance at the end of the compliance period.

If the CPS1 value is substantially below the required compliance value, the AGC control should be tightened for the rest of the current month to meet the compliance performance at the end of the twelve-month rolling average (the previous eleven months to the end of the current month).

Based on the real-time CPS1 value calculated at the end of each clock minute, which represents an average of the performance during the past eleven months and during the current month to the current clock minute, a one-minute CPS1 compliance target for the remaining one-minute intervals of the reporting period (i.e., to the end of the current month) is determined. That is, if the system is controlled to implement the CPS1 compliance target for the remaining minutes of the reporting period, then compliance with the CPS1 target at the end of the reporting period is assured.

However, since power system constraints may prevent implementation of the one-minute target for all future minutes of the compliance period, preferably the real-time CPS1 value is calculated at the end of each minute of the compliance period and the determined one-minute compliance target is implemented during the next minute. Thus the CPS1 compliance target is periodically determined and applied to power system control.

To implement the one-minute CPS1 compliance target, a one-minute ACE target is calculated from the one-minute CPS1 compliance target. The ACE target applies to each AGC control cycle during the next clock minute (that is, the CPS1 compliance target and the ACE target are determined at the end of a first clock minute and the ACE target is applied to all of the AGC control cycles during a second clock minute). The running average instantaneous ACE during the second clock minute (i.e., the instantaneous ACE values during the second clock minute averaged over the elapsed time of the second clock minute) is calculated at the end of each AGC cycle and compared with the ACE target for that minute. An ACE correction value is determined responsive to the comparison results and applied to the ACE value during the next AGC control cycle. If the absolute value of the running average ACE is less than the corresponding one-minute ACE target, no CPS1 correction is needed.

Alternatively, a deviation between each of the instantaneous ACE values at each AGC control cycle during the second clock minute and the ACE target for the second clock minute is determined. These deviations are summed and the ACE correction value is determined responsive to the sum. Either methodology yields the same correction value that is applied to the instantaneous ACE of the next AGC cycle to form the CPS1 correction amount. Application of the ACE correction value should (if the power system is not constrained from applying the full ACE correction value) bring the system into CPS1 compliance at the end of the current AGC control cycle. As the process continues through subsequent AGC control cycles and subsequent one-minute clock periods, continued application of ACE correction values will yield compliance at the end of the current month.

Each of the clock minutes remaining in the reporting period from the current clock minute is referred to as an intermediate clock minute. Thus the present invention determines a CPS1 compliant ACE target for each intermediate clock minute at the end of each intermediate clock minute. Since the CPS1 value calculated at the end of the current-minute depends on performance over the previous eleven calendar months plus all clock minutes of the current month including the immediately previous clock minute, the calculated ACE target will likely change every clock minute. That is, the calculated ACE target will likely be different for each intermediate clock minute.

In another embodiment, to ensure an acceptable outcome at the end of the month, a multiplier is defined (and can be modified) to scale down the calculated one-minute ACE target.

For a control system operator to operate the system in such a way that a safe CPS1 compliance margin is achieved, equation (2) is rewritten as follows:

$$CPS1 = \left(2 - AVG_{12\text{-}month}\left[\left(\frac{ACE_i}{-10B_i}\right)_i \Delta F_i\right]\bigg/\varepsilon_1^2\right) \times 100\% \geq p_{cps1} \quad (3)$$

where $p_{cps1}$ is a user-selectable CPS1 compliance target that in one embodiment equals 100% to ensure compliance with the NERC regulations. The $p_{cps1}$ value should be selected to ensure that as the system approaches the end of the 12-month CPS1 compliance period, real time operations are conducted to minimize the likelihood of a CPS1 violation during the last minutes of that compliance period. The operator can change the CPS1 compliance target from a default value of 100% to a different value, for instance, 125% to assure a safe compliance margin for the CPS1 value at the end of the compliance period.

A 12-month time period T has ($n_T$=365 days/year×24 hours/day×60 1-minute intervals/hour) 525,600 clock-minute time intervals. Let $n_t$ denote the number of clock-minute intervals that have elapsed from the beginning of the period T to the present time. Let $n_{T\text{-}t}$ designate the number of remaining clock-minute time intervals to the end of period T. Let $n_T$ designate the number of total clock-minute time intervals within the time period T.

To simplify the derivation that follows, define a random variable $$X = \left[\left(\frac{ACE_i}{-10B_i}\right)_i \Delta F_i\right]$$

Then the CPS1 standard can be equivalently expressed in probability term as $$\bar{X} = E\{X\} \leq (2 - p_{cps1})\varepsilon_1^2 \quad (4)$$

It is assumed that the expectation of X equals its time average for a sufficiently long time period.

Let the average of X during the $n_t$ clock-minute time period be denoted by $\bar{X}_1$, and let the average of X during the remaining $n_{T\text{-}t}$ clock-minute time periods be denoted by $\bar{X}_2$. Equation (4) can then be written as $$\bar{X} = \frac{n_t}{n_t + n_{T\text{-}t}}\bar{X}_1 + \frac{n_{T\text{-}t}}{n_t + n_{T\text{-}t}}\bar{X}_2 \leq (2 - p_{cps1})\varepsilon_1^2$$

Note that $n_T = n_t + n_{T\text{-}t}$, and $n_t$, $n_{T\text{-}t}$ and $n_T$ are all known and $\bar{X}_1$ can be computed as $$AVG_{n_t Clock\text{-}MinuteTime\ Intervals}\left[\left(\frac{ACE_i}{-10\ B_i}\right)_i \Delta F_i\right].$$

Therefore, $$\bar{X}_2 \leq [(n_t + n_{T\text{-}t})(2 - p_{cps1})\varepsilon_1^2 - n_t\bar{X}_1]/n_{T\text{-}t},$$

where $\bar{X}_2$ represents a statistical target for $$\left[\left(\frac{ACE_i}{-10\ B_i}\right)_i \Delta F_i\right]$$

the remaining $n_{T\text{-}t}$ clock-minute time horizon. This target value depends on the CPS1 performance to the current clock minute, as reflected in the parameter $\bar{X}_1$.

Thus if the condition $$\bar{X}_2 = \left[\left(\frac{ACE_i}{-10B_i}\right)_i \Delta F_i\right] \leq [(n_t + n_{T\text{-}t})(2 - p_{cps1})\varepsilon_1^2 - n_t\bar{X}_1]/n_{T\text{-}t} \quad (5)$$

is satisfied for every clock-minute for the remaining $n_{T\text{-}t}$ clock-minute time horizon, then the control area operator can achieve the desired performance governed by the equation set forth above, i.e., $$\bar{X}_2 \leq [(n_t + n_{T\text{-}t})(2 - p_{cps1})\varepsilon_1^2 - n_t\bar{X}_1]/n_{T\text{-}t}, \quad (6)$$

Thus $\bar{X}_2$ can be computed from the known values on the right of the inequality of equation (6). Further, the ACE target ($ACE_i$) based on the determined $\bar{X}_2$ value can be computed according to the left side of equation (5). To make this calculation a value for the parameter clock-minute average frequency error $\Delta F_i$ must be assumed. In one embodiment the clock-minute average frequency error $\Delta F_i$ for the previous clock minute is used as the value to calculate the ACE target from equation (5). Also, the previous value of the clock-minute average frequency bias $B_i$ can be used for the equation (5) calculation. Other representative values can be used for the $\Delta F_i$ and $B_i$ terms in equation (5). The ACE target value from equation (5) represents the CPS1 control amount.

Therefore, if $\Delta F_i > 0$, then $$ACE_i \leq \{[(n_t + n_{T\text{-}t})(2 - p_{cps1})\varepsilon_1^2 - n_t\bar{X}_1]/n_{T\text{-}t}\}(-10B_i)/\Delta F_i \quad (7)$$

If $\Delta F_i < 0$, then $$ACE_i \geq \{[(n_t + n_{T\text{-}t})(2 - p_{cps1})\varepsilon_1^2 - n_t\bar{X}_1]/n_{T\text{-}t}\}(-10B_i)/\Delta F_i \quad (8)$$

In another less aggressive embodiment, the largest absolute value clock-minute average frequency error $\Delta F_i$ denoted by $$(\Delta F_i)_m = \max_i(\{|\Delta F_i|\})\ \text{sign}\ (\Delta F_i),$$

during a past time period (for instance, the previous 30-minute time period) is used to calculate the current clock-minute ACE target from equation (5). The sign of $(\Delta F_i)_m$ is the same as the sign of $\Delta F_i$.

According to this embodiment the clock-minute ACE target is calculated as $$ACE_i = \{[(n_t + n_{T\text{-}t})(2 - p_{cps1})\varepsilon_1^2 - n_t\bar{X}_1]/n_{T\text{-}t}\}(-10B_i)/\Delta F_i \quad (9)$$

To provide the operator with additional system operating flexibility, in another embodiment a gain value for $(\Delta F_i)_m$ (that is, a factor multiplying $(\Delta F_i)_m$ in equation (9)) is introduced and denoted by $g_{\Delta F}$. In a default embodiment the gain value is one resulting in the expression of equation (9). When the CPS1 value to date (the past eleven months and the current month to the current time) is deemed more than satisfactory, the operator can change the gain to a smaller value hence increasing the magnitude of the clock-minute ACE target (relaxing the target ACE control, which is desired from a power system cost and operational perspective). When the CPS1 value to date is deemed less than satisfactory, the operator can use a larger gain value, making the clock-minute ACE target magnitude smaller (requiring more exacting (and costly) power system control to implement the smaller ACE value) and thus increase the amount of implemented CPS1 correction. In either case, the CPS1 compliance values must be satisfied at the end of the compliance period as mandated by the NERC.

If an excessively small gain value is selected by the operator, the CPS1 value may be non-compliant at the end of the compliance period, suggesting that a change to a larger gain value is warranted. Implementation of the teachings of the present invention assist with this compliance effort.

Accordingly, for the gain-included embodiment, the clock-minute ACE target is obtained as:

$$ACE_{i,Target} = \{[(n_t+n_{T-t})(2-p_{cps1})\epsilon_1^2 - n_t \bar{X}_1]/n_{T-t}\}(-10B_i)/[g_{\Delta F} \times (\Delta F_i)_m] \quad (10)$$

According to one embodiment the CPS1 based correction and the corresponding one-minute ACE target are determined by first determining an upper one-minute ACE target $ACE_i^U$ and a lower one-minute ACE target $ACE_i^L$ defined as follows. This embodiment uses the gain factor and the parameter $(\Delta F_i)_m$.

$$ACE_i^U = |\{[(n_t+n_{T-t})(2-p_{cps1})\epsilon_1^2 - n_t \bar{X}_1]/n_{T-t}\}(-10B_i)/[g_{\Delta F} \times (\Delta F_i)_m]| \quad (11)$$

$$ACE_i^L = -|\{[(n_t+n_{T-t})(2-p_{cps1})\epsilon_1^2 - n_t \bar{X}_1]/n_{T-t}\}(-10B_i)/[g_{\Delta F} \times (\Delta F_i)_m]| \quad (12)$$

These clock-minute ACE targets are calculated every minute, which is the shortest time granularity that is meaningful for the twelve month CPS1 reporting period.

The CPS1 compliant control scheme demands that the CPS-based AGC must issue appropriate control actions such that the absolute value of the current one-minute average ACE (average of the instantaneous ACE values over the current minute) is below the absolute value of the calculated CPS1 one-minute average ACE target, as shown in Eq. (10), subject to system constraints.

The corrective control amount (or simply correction) based on the CPS1 control scheme of the present invention is calculated as follows and used to determine the system total desired generation that is applicable during each AGC cycle j of each clock minute i according to the following method.

I. Calculate the CPS1 upper target $ACE_i^U$ and lower target $ACE_i^L$ for the current one-minute time interval according to Eqs. (11) and (12).

II. Calculate the deviations of the instantaneous area control error $ACE_j$, where the subscript j denotes an AGC control cycle j during a clock minute i, from both the upper and lower one-minute average ACE targets. The deviation of ACE from its upper target is denoted by $Delta\_ACE_{j,From\_Upper}$ and calculated as $Delta\_ACE_{j,From\_Upper} = ACE_j - ACE_i^U$; and similarly, the deviation of ACE from its lower target is denoted by $Delta\_ACE_{j,From\_Lower}$ and calculated as $Delta\_ACE_{j,From\_Lower} = ACE_j - ACE_i^L$ The number of calculated deviations is determined by the number of control cycles during the current minute i. For a four second control cycle, 15 deviation values are determined during the minute i.

III. Sum the $Delta\_ACE_{j,From\_Upper}$ values and the $Delta\_ACE_{j,From\_Lower}$ values, respectively, from the beginning of the current one-minute time interval i to the previous AGC control cycle j−1 (the previous AGC control cycle is included in the sum). Denote these sums by $Sum\_dACE_{i,From\_Upper}^j$ and $Sum\_dACE_{i,From\_Lower}^j$ since they are determined at the control cycle j within the clock minute i.

IV. Record the number of AGC control cycles from the beginning of the current one-minute time interval up to the previous AGC control cycle j−1 and denote this number as $Sum\_Cycles_i^j$. For example assume processing is in the middle of a clock minute at 10:33:24. Within the current clock minute 10:33:00 to 10:33:59, there are still 35 seconds remaining. For the elapsed time of 24 seconds in this clock minute, the deviations are accumulated and the number of AGC control cycles (24/4=6 if the control cycle time is 4 seconds) are counted. Similarly sum all the instantaneous ACE values from the beginning of the current one-minute time interval up to the previous AGC control cycle j−1 and denote this number by $Sum\_ACE_i^j$.

V. Calculate the running one-minute ACE average $Avg1\_ACE_i^j$ for the one-minute time period up to the previous AGC control cycle j−1 as $$Avg1\_ACE_i^j = \frac{Sum\_ACE_i^j}{Sum\_Cycles_i^j}.$$

VI. Determine the correction amount as follows:
   a. If $0 \leq Avg1\_ACE_i^j < ACE_i^U$, correction amount is 0, this implies that no CPS1 correction is needed.
   b. If $ACE_i^L < Avg1\_ACE_i^j < 0$, correction amount is 0, this implies that no CPS1 correction is needed.
   c. Otherwise, there will be CPS1 correction, and the correction amount $Correction_j$ is calculated as follows:

If $Avg1\_ACE_i^j \geq ACE_i^U$, then $$Correction_j = -(Sum\_dACE_{i,From\_Upper}^{j-1} + ACE_j) = -(Sum\_dACE_{i,From\_Upper}^j + ACE_i^U)$$

If $Avg1\_ACE_i^j \leq ACE_i^L$, then $$Correction_j = -(Sum\_dACE_{i,From\_Lower}^{j-1} + ACE_j) = -(Sum\_dACE_{i,From\_Lower}^j + ACE_i^L)$$

The first term in the correction expression is simply an integral action that is applied as negative feedback to reduce the accumulated deviation of the instantaneous ACE from its one-minute average ACE. This correction (as an absolute value) is clamped to the system-allowed single AGC cycle maximum correction quantity. That is, although the above equations calculate the desired correction, the desired correction is constrained by the system's physical capacity. For example, the present invention may determine a 100 MW correction for an AGC control cycle, but the system has a physical constraint that permits only a 50 MW correction. Thus the actual implemented correction is reduced from the desired 100 MW to 50 MW.

Since CPS2 control (described further below) has higher priority than CPS1 control, if CPS2 correction and CPS1 correction are in the same direction, the larger correction amount is used for AGC control; if CPS1 correction and CPS2 correction are in opposite directions, only CPS2 correction is used for AGC control, and CPS1 correction is ignored; if CPS1 correction is zero and CPS2 is non-zero, CPS2 correction is used for AGC control; if CPS2 correction is zero and CPS1 is non-zero, CPS1 correction is used for AGC control; if both CPS1 correction and CPS2 correction are zero, no CPS correction is included in the AGC control.

If the instantaneous ACE values do not change sign during an entire clock-minute, then the control scheme of the present invention determines a clock-minute ACE target that has the same sign as the instantaneous ACE values, which is desired to minimize the control effort. That is, this technique loosens the AGC control or minimizes the frequency of AGC control and also the control magnitude.

If the instantaneous ACE values change sign during a clock-minute, correction to the clock-minute ACE target that has the same sign as the running clock-minute ACE average is the least correction that the system requires to move the running clock-minute ACE average within the range determined by the lower and upper clock-minute ACE targets. The accumulation of deviation from any one clock-minute ACE target partially cancels the accumulation of deviation from the other clock-minute ACE targets.

For the first AGC cycle of a clock minute, if ACE is outside the desired range determined by the clock-minute ACE targets then the correction will be a negative ACE.

It can be shown that by following the above control scheme, if the system responds to implement the determined corrections, the sum of ACE deviation from the ACE target will be constrained within the desired range determined by the upper ACE target and the lower ACE target.

According to another embodiment a dead band is added to each of the two clock-minute ACE targets to avoid swinging the running clock-minute ACE average around the clock-minute ACE targets. Such a scenario can be triggered by any random factors that affect ACE. The dead-band also reduces the likelihood that the clock-minute ACE average will extend outside the desired range near the end of any clock minute.

For example, specify the dead band of the upper clock-minute ACE target as 10% of this ACE target.

If $ACE_i^U > Avg1\_ACE_i^j \geq 0.9 * ACE_i^U$ and $0 \leq Avg1\_ACE_i^{j-1} < 0.9 * ACE_i^U$, no CPS1 correction is issued.

If $ACE_i^U > Avg1\_ACE_i^j \geq 0.9 * ACE_i^U$ and $Avg1\_ACE_i^{j-1} \geq ACE_i^U$, CPS1 correction is issued.

If $Avg1\_ACE_i^j \geq ACE_i^U$, CPS1 correction is issued.

If $0 \leq Avg1\_ACE_i^j < 0.9 * ACE_i^U$, no CPS1 correction is issued.

In another embodiment, the present invention predictively controls the CPS2 performance criteria (a statistical value over the current month) to avoid non-compliance. Using historical performance data up to the previous clock 10-minute interval, the present invention determines the historical compliance performance. If the CPS2 value is well above the required compliant value, then the AGC control can be relaxed for the remainder of the current month; if it is well below the required compliant value, the AGC control should be tightened for the rest of the current month to meet the required compliance performance at the end of the month.

According to the invention, at the beginning of each clock 10-minute period a compliance target is calculated based on previous performance. The ten-minute ACE target for the current ten-minute period is calculated from the compliance target. To be conservative, one embodiment defines a multiplier (the value of which can be changed by the user/operator) to scale the calculated ten-minute ACE target.

With the ten-minute ACE target determined, at each AGC cycle of the clock 10-minute period, the running average ACE is calculated and monitored against the associated ten-minute ACE target. Specifically, the deviation of the instantaneous ACE from the ten-minute ACE target is accumulated at each previous AGC cycle of the current ten-minute period and the accumulated value is added to the instantaneous ACE of the current AGC cycle to form the CPS2 correction amount. If the absolute value of the running 10-minute average ACE is less than the corresponding ten-minute ACE target no CPS2 correction is needed.

For CPS2 the NERC requires a 90% compliance for 10-minute ACE averages over a one month period. The CPS2 standard can be defined as:

$$Avg_{10\text{-}minute}[ACE_i] \leq L_{10}$$

where:

$ACE_i$ is the instantaneous tie-line bias ACE value $L_{10} = L_{pr} \cdot \epsilon_{10} \cdot \sqrt{(-10B_i)(-10B_s)}$ $\epsilon_{10}$ is the constant derived from the targeted frequency bound in Hz.

$L_{pr}$ is the constant equal to 1.65 used to convert the frequency target to yield the 90% probability value $B_i$ is the frequency bias of the control area in MW/0.1 Hz $B_s$ is the frequency bias of the interconnection in MW/0.1 Hz.

One month (for example, in the case of a 30-day month) has 30 days×24 hours×6 10-minute intervals), that is, T=4320 10-minute time intervals. Denote the current time interval with t. $n_t$ denotes the number of valid $ACE_{10\text{-}min}$ values (instantaneous ACE values averaged over ten minutes) and $v_t$ the number of CPS2 non-compliant intervals to the present interval t. $n_{T-t}$ denotes the number of remaining time intervals to the end of the T time intervals. There will be $v_{T-t}$ CPS2 violations during the remainder of the compliance period.

To comply with the CPS2 standard with 90% compliance at the end of T time intervals, the following relation should be satisfied. A variable compliance target $p_{cps2}$ is used in the equation; in one embodiment the compliance target default value is 90%, where the numerator indicates the number of non-compliant ten minute intervals (past non-compliant intervals plus future non-compliant intervals) during the current month and the denominator indicates the number of compliant ten-minute intervals during the current month.

$$\frac{v_t + v_{T-t}}{n_t + n_{T-t}} \leq 1 - p_{cps2} \quad (13)$$

or $$\frac{v_{T-t}}{n_{T-t}} \leq (1 - p_{cps2}) + \frac{(1 - p_{cps2}) \cdot n_t - v_t}{n_{T-t}} = p_{T-t}$$

where $p_{T-t}$ represents the violation probability target threshold for the remaining T-t time horizon (the remaining clock ten-minute time periods), and $(1-p_{T-t})$ represents the expected minimum compliance target for the remaining T-t clock ten-minute time periods. Note that $p_{T-t}$ can be lower or higher than $(1-p_{cps2})$ (having a default value of 0.1) depending on performance to the present time interval t.

The variable $p_{cps2}$ is introduced in equation (13) in one embodiment to enable the operator to specify a compliance target (for example 92%, which is different than the mandated 90% target) to allow a safety margin to ensure that the compliance target is not violated.

The CPS2 criteria can be expressed in probability terms as $$P\{|[\overline{ACE_{10}}]| \leq L_{10}\} \geq p_{cps2}$$

where $[\overline{ACE_{10}}]$ is a random variable that represents the ten-minute ACE averages over one month.

Let $B_{10} = \epsilon_{10} \cdot \sqrt{(-10B_i)(-10B_s)}$ then $L_{10} = 1.65 B_{10}$ It is assumed in NERC's CPS criteria derivation that $[\overline{ACE_{10}}]$ has a normal distribution with an expected value of zero and a standard deviation of $$\sigma_{[\overline{ACE_{10}}]} \left( \text{where } \sigma^2_{[\overline{ACE_{10}}]} = E\{[\overline{ACE_{10}}]^2\} \right).$$

To simplify, normalize $[\overline{ACE_{10}}]$ such that $$ace_{10} = [\overline{ACE_{10}}]/\sigma_{[\overline{ACE_{10}}]}$$

Then $ace_{10}$ has a standard normal distribution with expected value of zero and a standard deviation of one. Its probability density function is $$p(x) = \frac{1}{\sqrt{2\pi}}\exp\left\{-\frac{x^2}{2}\right\},$$

Now CPS2 criteria can be rewritten in terms of $ace_{10}$ as follows:

$$P\{|ace_{10}| \leq L_{10}/\sigma_{[\overline{ACE_{10}}]}\} \geq p_{cps2}$$

For any non-negative y, there exists a unique non-negative x such that $$P\{|ace_{10}| \leq x\} = \frac{1}{\sqrt{2\pi}}\int_{-x}^{x}\exp\left\{-\frac{t^2}{2}\right\}dt = y \quad (14)$$

then if $$L_{10}/\sigma_{[\overline{ACE_{10}}]} \geq x,$$

we have $P\{|ace_{10}| \leq x\} \geq y$

Let y be a target for expected CPS2 compliance as calculated in Eq. (13), that is, $$y = 1 - p_{T-t} = p_{cps2} - \frac{(1-p_{cps2}) \cdot n_t - v_t}{n_{T-t}}, \quad (15)$$

the normalized $ace_{10}$ target x can be immediately computed from equations (14) and (15). For example, when y=0.9, x=1.65.

With $$L_{10}/\sigma_{[\overline{ACE_{10}}]} \geq x,$$

we have $$\sigma_{[\overline{ACE_{10}}]} \leq L_{10}/x.$$

Since $$\sigma_{[\overline{ACE_{10}}]}$$

can be calculated using an average approach (approximation of the expectation of $[\overline{ACE_{10}}]^2$), we can readily calculate the CPS2 ACE ten-minute target for the next 10-minute interval.

That is, from $$\left(\sum_{i=1}^{t-1}[\overline{ACE_{10}}]_i^2 + [\overline{ACE_{10}}]_t^2\right)/(t-1) = L_{10}/x \quad (15)$$

calculate $$|[\overline{ACE_{10}}]_t| = \sqrt{((t-1)\times L_{10}/x) - \sum_{i=1}^{t-1}[\overline{ACE_{10}}]_i^2}$$

This value can be used as the CPS2 target that affects the control amount.

In an embodiment that permits the operator to adjust the calculated ten-minute ACE target, a gain is introduced and denoted as $g_{ace10}$. This gain has a default value of 1.0, and can be manually changed by the operator.

If the overall CPS2 performance for the current month to the current ten minute interval is better than desired, the operator can increase the ten-minute ACE target by lowering the gain $g_{ace10}$, which implies that the absolute value of the running ten-minute ACE above the 10-minute ACE target without using the gain could be below the adjusted 10-minute ACE target using the gain. This reduces the number of control actions to achieve better system economics with an appropriate sacrifice of the overall CPS2 performance, yet ensuring that the resulting overall CPS2 performance at the end of the reporting period is still slightly above the desired (compliant) value.

If the overall CPS2 performance for the current month to the current ten minute interval is worse than desired, the operator can decrease the ten-minute ACE target by increasing the gain $g_{ace10}$, which implies that the absolute value of the running ten-minute ACE below the ten-minute ACE target without using the gain could be above the adjusted ten-minute ACE target after using the gain, hence increasing the number of control actions to improve the overall CPS2 performance over the remaining 10-minute time periods of the current month.

It is noted that the operator-determined variable compliance target $p_{cps2}$ defined above, also allows the operator to affect the CPS2 value at the end of the current month.

The CPS2 control scheme of the invention demands that CPS based AGC must take appropriate control actions such that the absolute value of the current 10-minute ACE average is below the calculated CPS2 target, as shown in Eq. (15).

To determine the CPS2-based correction, the clock 10-minute ACE upper target $ACE10_t^U$ and lower target $ACE10_t^L$ are defined as follows:

$$ACE10_t^U = |g_{ace10}| \times \sqrt{((t-1)\times L_{10}/x) - \sum_{i=1}^{t-1}[\overline{ACE_{10}}]_i^2} \quad (16)$$

$$ACE10_t^L = -|g_{ace10}| \times \sqrt{((t-1)\times L_{10}/x) - \sum_{i=1}^{t-1}[\overline{ACE_{10}}]_i^2} \quad (17)$$

The corrective control amount (or correction) based on this CPS2 control scheme is calculated as follows, and used to determine the system total desired generation, which is applicable to each AGC cycle j of each clock 10-minute interval t:

1. Calculate the CPS2 clock ten minute ACE upper target $ACE10_t^U$ and lower target $ACE10_t^L$ for the current ten-minute time interval as shown in Eqs. (16) and (17) above.

2. Calculate the deviations of the instantaneous ACE, $ACE_j$, during a clock ten-minute period from both of its ten-minute ACE upper and lower targets, respectively. The deviation of ACE from its upper target is denoted $Delta\_ACE_{j,From\_Upper}$ and calculated as $$Delta\_ACE_{j,From\_Upper} = ACE_j - ACE10_t^U;$$

and similarly, the deviation of ACE from its lower target is denoted by $Delta\_ACE_{j,From\_Lower}$ and calculated as $$Delta\_ACE_{j,From\_Lower} = ACE_j - ACE_t^L.$$

3. Sum up $Delta\_ACE_{j,From\_Upper}$'s, and $Delta\_ACE_{j,From\_Lower}$'s, respectively, from the beginning of the current ten-minute time interval up to the immediately previous AGC control cycle (including the immediately previous AGC control cycle), and denote these sums by $$Sum\_dACE_{t,From\_Upper}^j \text{ and}$$

$$Sum\_dACE_{t,From\_Lower}^j$$

for inclusion of relevant samples of up to cycle j within the clock minute t.

4. Record the number of AGC control cycles from the beginning of the current ten-minute time interval up to the immediately previous AGC control cycle, and denote this number as $Sum\_Cycles_t^j$. Similarly sum the instantaneous ACE's from the beginning of the current ten-minute time interval to the immediately previous AGC control cycle and denote this number by $Sum\_ACE_t^j$.

5. Calculate the running 10-minute ACE average $Avg10\_ACE_t^j$ for the time period up to the immediately previous AGC control cycle as $$Avg10\_ACE_t^j = \frac{Sum\_Ace_t^j}{Sum\_Cycles_t^j}$$

6. Determine the correction amount as follows:
   a. If $0 \leq Avg10\_ACE_t^j < ACE10_t^U$, correction amount is 0, this implies that no CPS2 correction is needed.
   b. If $ACE10_t^L < Avg10\_ACE_t^j < 0$, correction amount is 0, this implies that no CPS2 correction is needed.
   c. Otherwise, there will be CPS2 correction and the correction amount $Correction_j$ is calculated as follows:

If $Avg10\_ACE_t^j \geq ACE10_i^U$ then $$Correction_j = -(Sum\_dACE_{t,From\_Upper}^{j-1} + ACE_j) = -(Sum\_dACE_{t,From\_Upper}^j + ACE10_t^U)$$

If $Avg10\_ACE_t^j \leq ACE10_t^U$, then $$Correction_j = -(Sum\_dACE_{t,From\_Lower}^{j-1} + ACE_j) = -(Sum\_dACE_{t,From\_Lower}^j + ACE10_t^L)$$

This correction is clamped to the system allowed single AGC cycle maximum correction in quantity without considering the sign. The first term in the expression of $Correction_j$ is simply an integral action that is taken in negative feedback to reduce the integrated deviation of the instantaneous ACE from its 10-minute average ACE.

Since CPS2 control has higher priority than CPS1 control, if CPS2 correction and CPS1 correction are in the same direction, the larger correction amount will be used for AGC control; if CPS1 correction and CPS2 correction are in opposite direction, only CPS2 correction will be used for AGC control, and CPS1 correction is ignored; if CPS1 correction is zero and CPS2 is non-zero, CPS2 correction will be used for AGC control; if CPS2 correction is zero and CPS1 is non-zero, CPS1 correction will be used for AGC control; if both CPS1 correction and CPS2 correction are zero's, no CPS correction will be included in AGC control.

If ACE does not change sign during an entire clock-minute, then the above control scheme identifies the clock ten-minute ACE target that has the same sign as ACE during the entire clock ten-minute, which is a desired situation. If the ACE value changes sign during the clock 10-minute interval, correction to the clock ten-minute ACE target that has the same sign as the running clock ten-minute ACE average is the least correction that the system needs to move the running clock ten-minute ACE average within the range determined by the lower and upper clock ten-minute ACE targets. The accumulation of deviation from one clock ten-minute ACE target partially cancels out the accumulation of deviation from the another clock 10-minute ACE target.

By following the above control scheme, if the system responds to make corrections as desired, the sum of ACE deviation from the ACE target is constrained within the desired range determined by the upper CPS2 ACE target and the lower CPS2 ACE target.

For the first AGC cycle of a clock ten-minute interval, if ACE is outside the desired range determined by the clock-minute ACE targets, then the correction is negative ACE.

In another embodiment a dead-band is added to each of the two clock 10-minute ACE targets (upper and lower) to avoid the running clock-minute ACE average swinging around the clock ten-minute ACE targets (which could be triggered by any random factors that affect ACE) and to decrease the likelihood of the clock ten-minute ACE average going out of the desired range near the end of any clock ten-minute. For example, let the dead-band of the upper clock 10-minute ACE target be specified as 10% of the ACE target.

If $ACE10_t^U > Avg10\_ACE_t^j \geq 0.9*ACE10_t^U$ and $0 \leq Avg10\_ACE_t^{j-1} < 0.9*ACE10_t^U$, no CPS2 correction is issued.

If $ACE10_t^U > Avg10\_ACE_t^j \geq 0.9*ACE10_t^U$ and $Avg10\_ACE_t^{j-1} \geq ACE10_t^U$, CPS2 correction is issued.

If $Avg10\_ACE_t^j \geq ACE10_t^U$, CPS2 correction is issued.

If $0 \leq Avg10\_ACE_t^j < 0.9*ACE_t^U$, no CPS2 correction is issued.

FIG. 1 is a block diagram of an exemplary energy management system 10 that incorporates the teachings of the present invention. The energy management system 10 provides NERC compliant operation. An automatic generation control (AGC) database 14 stores all monitoring and control data and applications related to the power system under operator management, such as frequency and power values required to calculate the instantaneous ACE values as described above. These operating values are supplied by monitoring and control devices 16 such as sensors, and actuators and/or through a monitoring and control network such as a SCADA network.

A CPS1 module 20 and a CPS2 module 24 receive data form AGC database 16 for performing the computations as described above to control the system and render the system compliant with the NERC CPS1 and CPS2 values. Further the CPS1 and CPS2 modules 20 and 24 store calculation results and historical data for use in the CPS1 and CPS2 calculations described above. It should be understood that a reference to a module includes but is not limited to a set of instructions executable by a processor and may take the form of software, firmware or hardware or any combination thereof. Moreover, a processor should be understood to mean one or more computing devices or hardware devices that execute the commands in the set of instructions.

A decision control module 30 receives real-time input from the separate CPS modules 20 and 24 and makes AGC decisions based on signal priority and other control factors known by those skilled in the art. For example, the control signals generated from the CPS1 and CPS2 modules 20 and 24 may be assigned priorities as to their effect on the AGC signal. Generally, the CPS2 module results are given a higher priority than the CPS1 module results.

After the decision control module 30 has determined the corrective action, the module 30 issues a command to the generation allocation module 34 to implement the necessary AGC regulation, which ensures compliance to the CPS1 and CPS2 standards, to available generators. The allocation of MW generation to available generators is based on assigned participation factors and generator physical, operational and economic characteristics. Further, the allocation is implemented to maintain the overall unit generation requirement stable and prevent excessive unit maneuvering.

Figure 2:
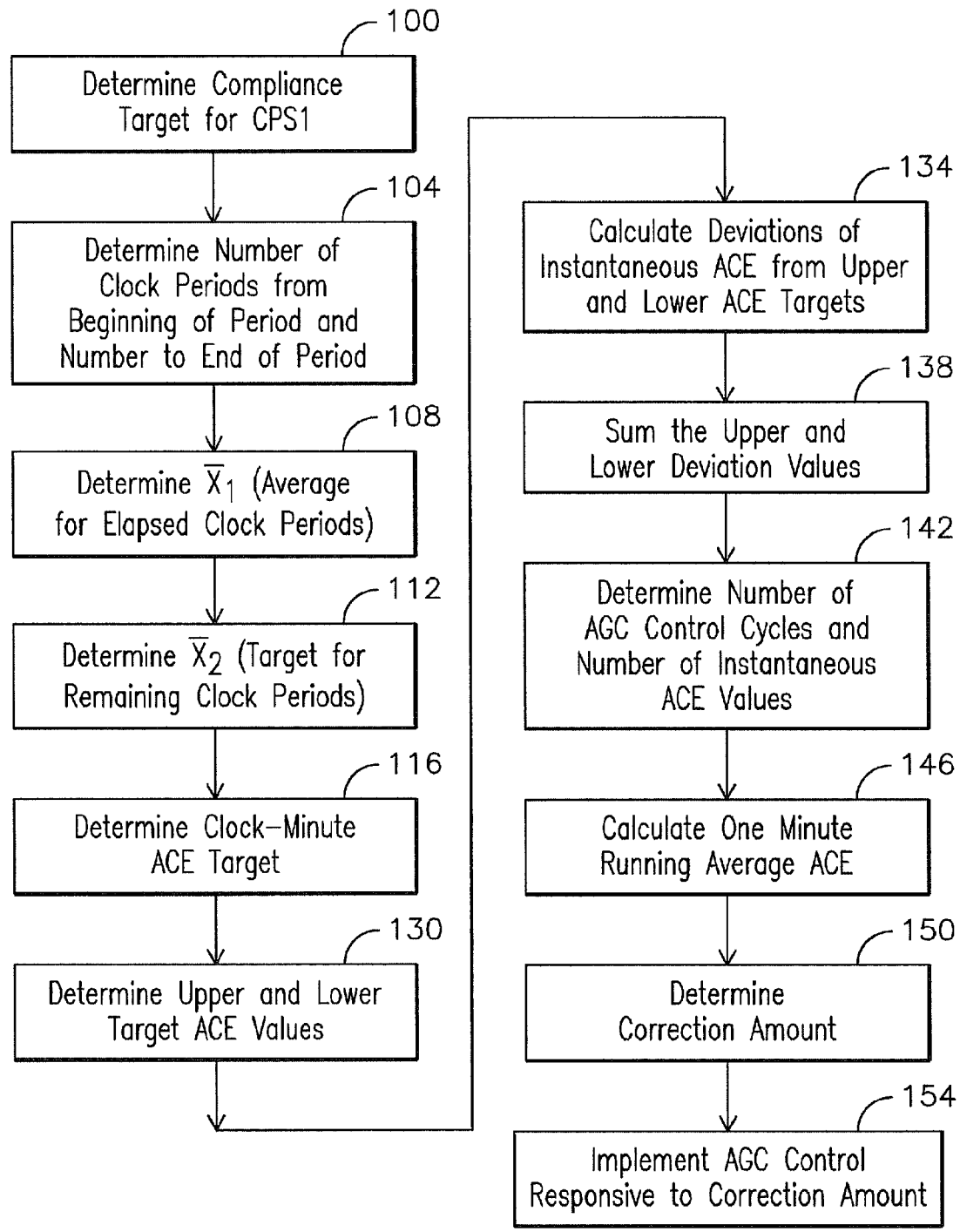
FIGS. 2 and 3 are software flowcharts illustrating the process for determining the predictive CPS1 and CPS2 values according to the teachings of the present invention.
Figure 3:
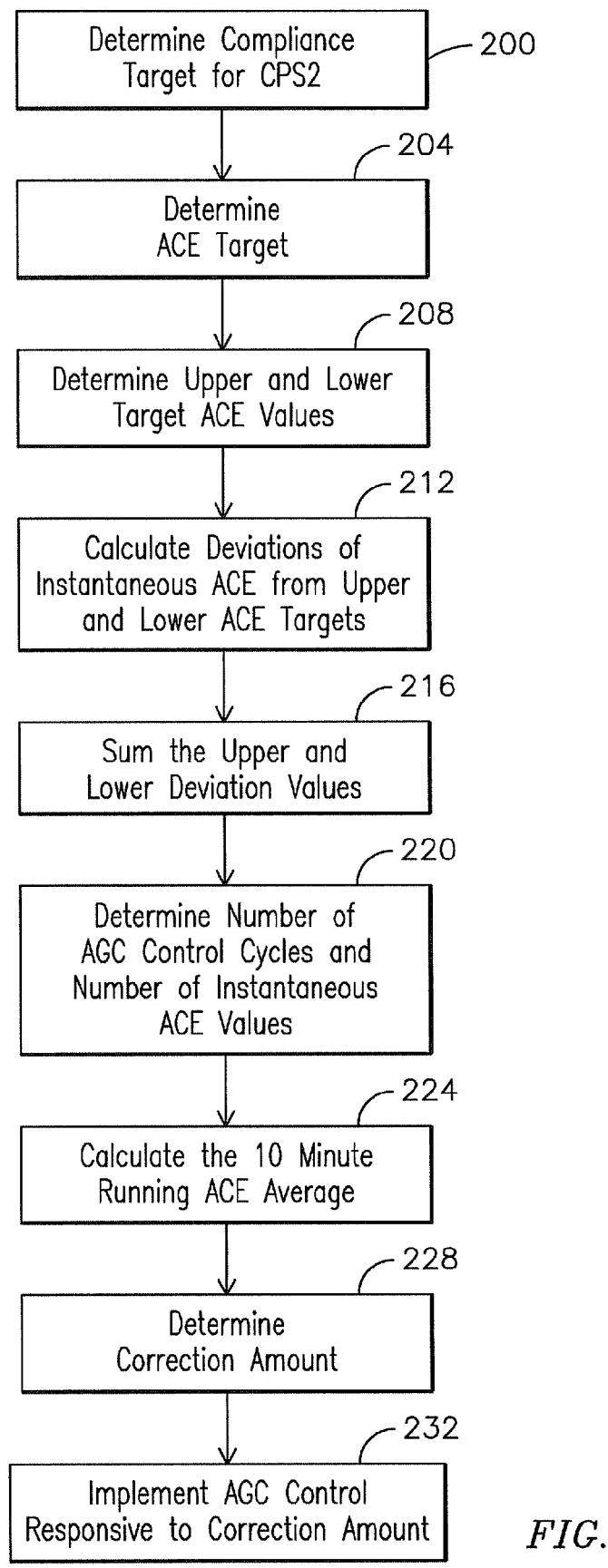

The flow charts of FIGS. 2 and 3 depict the steps described above for control of a power system responsive to predicted values of CPS1 and CPS2.

At a step 100 of FIG. 2 a CPS1 compliance target is determined. At a step 104 the number of clock periods from the beginning of the period and to the end of the period are determined. The average $X_1$ and $X_2$ values are determined at respective steps 108 and 112. The clock minute ACE target is determined at a step 116. Upper and lower ACE targets are determined at a step 130. Deviations for the upper and lower targets are calculated at a step 134 and the deviations summed at a step 138. Using the values determined at a step 142, the one-minute ACE running average is determined at a step 146. The ACE correction amount is determined at a step 150 and applied to the power system at a step 154.

At a step 200 of FIG. 3 a CPS2 compliance target is determined. At a step 204 the ACE target is determined and the upper and lower ACE targets are determined at a step 208. Deviations for the upper and lower targets are calculated at a step 212 and the deviations summed at a step 216. Using the values determined at a step 220, the ten-minute ACE running average is determined at a step 224. The ACE correction amount is determined at a step 228 and applied to the power system at a step 232.

Persons skilled in the art recognize that an apparatus, such as a data processing system, including a CPU, memory, I/O, program storage, a connecting bus, and other appropriate components, could be programmed or otherwise designed to facilitate the practice of the method embodiments of the invention, including the flowcharts of FIGS. 2 and 3. Such a system includes appropriate programs or applications for executing the methods of these embodiments. Software applications within the system can be used to perform the various calculations and logical operations described herein. Certain applications may be beneficially used to perform certain operations and other applications may be beneficially used to perform other operations.

Data processing systems, tools, modules and applications presently operative in a power system can be used to perform the calculations and operations associated with the present invention. The segregation of the calculations and operations among such systems, tools, modules and applications, such as database applications and calculating tools, depends on the availability of such computing resources.

In another embodiment, an article of manufacture, such as a pre-recorded disk or other computer program product, for use with a data processing system, includes a storage medium and a program recorded thereon for directing the data processing system to facilitate practicing the methods of the inventions. Such apparatuses and articles of manufacture also fall within the spirit and scope of the inventions.

The inventions are described in the general context of computer-executable instructions, such as program modules, executed by a computer. Generally, program modules include routines, programs, objects, components, data structures, etc. that perform particular tasks or implement particular abstract data types. For example, the software programs that underlie the inventions can be coded in different languages, for use with different processing platforms. It will be appreciated that the principles that underlie the invention can be implemented with different types of computer software technologies.

Moreover, those skilled in the art will appreciate that the invention embodiments may be practiced with different computer system configurations, including hand-held devices, multiprocessor systems, microprocessor-based or programmable consumer electronics, minicomputers, mainframe computers, and the like. The embodiments may also be practiced in a distributed computing environment where tasks are performed by remote processing devices that are linked through a communications network. In the distributed computing environment, program modules may be located in both local and remote computer storage media including memory storage devices.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for controlling a power system control area during a plurality of consecutive automatic generation control cycles to ensure compliance with a first control performance standard at an end of a rolling first compliance period and compliance with a second control performance standard at an end of a second fixed compliance period, the method comprising:

(a) determining a clock minute average for an area control error term during a plurality of past clock minutes;

(b) determining a first control performance standard statistical measure from a beginning of the rolling first compliance period to a time at which the first statistical measure is determined, the first control performance standard statistical measure responsive to the clock minute averages for the area control error term;

(c) determining a second control performance standard statistical measure from a beginning of the fixed second compliance period to a time at which the second statistical measure is determined, the second control performance standard statistical measure responsive to the cock minute averages for the area control error term;

(d) determining a first area control error target responsive to the first control performance standard statistical measure;

(e) determining a second area control error target responsive to the second control performance standard statistical measure;

(f) determining a first control performance standard correction value responsive to the first area control error target;

(g) determining a second control performance standard correction value responsive to the second area control error target; and (h) controlling the power system according to one or both of the first and the second control performance standard corrections values, wherein if both the first and the second control performance standard correction values are in a same direction controlling the power system according to a larger of the first and the second control performance standard correction values, wherein if the first and the second control performance standard correction values are in opposite directions controlling the power system according to the second control performance standard correction value.

2. The method of claim 1 wherein if one of the first and the second control performance standard correction values is substantially zero, the non-zero first or second control performance standard correction value is used according to the step (h).

3. The method of claim 1 wherein the first control performance standard comprises control performance standard 1 and the second control performance standard comprise control performance standard 2.

4. The method of claim 1 wherein the first compliance target comprises 100%, the first compliance period comprises a calendar year, the second compliance target comprises 90% and the second compliance period comprises a calendar month.

5. An apparatus for controlling a power system control area during a plurality of consecutive automatic generation control cycles to ensure compliance with a first control performance standard at an end of a rolling first compliance period and compliance with a second control performance standard at an end of a second fixed compliance period, the apparatus comprising:
a memory for storing area control error values determined from operational of the power system control area;
a first module executable by a processor for determining a first measure of the first control performance standard responsive to the area control error values from a beginning of a first compliance period to the time at which the first measure is determined;
a second module executable by the processor for determining a second measure of the second control performance standard responsive to the area control error values from a beginning of a second compliance period to the time at which the second measure is determined;
a third module executable by the processor for determining a first area control error target responsive to the first measure and to a compliance target for the first control performance standard, and for determining a second area control error target responsive to the second measure and to a compliance target for the second control performance standard;
a fourth module executable by the processor for determining a first control performance standard correction value responsive to the first area control error target and for determining a second control performance standard correction value responsive to the second area control error target; and
a fifth module executable by the processor for controlling the power system control area according to one or both of the first and the second control performance standard correction values, wherein if both the first and the second control performance standard correction values are in a same direction, controlling the power system according to a larger of the first and the second control performance standard correction values, wherein if the first and the second control performance standard correction values are in opposite directions, controlling the power system according to the second control performance standard correction value.

6. The apparatus of claim 5 wherein the operation comprises actual and scheduled incoming and outgoing power flows and actual and scheduled interconnection frequency.

7. The apparatus of claim 5 wherein if one of the first and the second control performance standard correction values is substantially zero, a non-zero first or second control performance standard correction value is used by the fifth module.

8. The apparatus of claim 5 wherein the first control performance standard comprises control performance standard 1 and the second control performance standard comprises control performance standard 2.

9. The apparatus of claim 5 wherein the compliance target for the first control performance standard comprises 100%, the first compliance period comprises a calendar year, the compliance target for the second control performance standard comprises 90% and the second compliance period comprises a calendar month.

10. The apparatus of claim 5 wherein the first and the second measures are determined from the beginning of the respective first and second compliance periods to a time t, wherein the fourth module executable by the processor determines the first area control parameter correction responsive to the first area control parameter target and the area control parameter values to the time t and determines the second area control parameter correction responsive to the second area control parameter target and the area control parameter values to the time t.

11. A computer program product for controlling a power system control area during a plurality of consecutive automatic generation cycles to ensure compliance with a first control performance standard at an end of a rolling first compliance period and compliance with a second control performance standard at an end of a second fixed compliance period, the computer program product comprising:
a computer usable medium having computer readable program code modules embodied in the medium for controlling the power system control area;
a computer readable first program code module for determining a clock minute average for an area control error term during a plurality of clock minutes;
a computer readable second program code module for determining a first control performance standard statistical measure from a beginning of the rolling first compliance period to a time at which the first statistical measure is determined, the first control performance standard statistical measure responsive to the clock minute averages for the area control error term;
a computer readable third program code module for determining a second control performance standard statistical measure from a beginning of the second compliance period to a time at which the second statistical measure is determined, the second control performance standard statistical measure responsive to the clock minute averages for the area control error term;
a computer readable fourth program code module for determining a first area control error target responsive to the first performance standard statistical measure;
a computer readable fifth program code module for determining a second area control error target responsive to the second performance standard statistical measure;
a computer readable sixth program code module for determining a first control performance standard correction value responsive to the first area control error target;
a computer readable seventh program code module for determining a second control performance standard correction value responsive to the second area control error target;

a computer readable eighth program code module for controlling the power system according to one or both of the first and the second area control performance standard correction value, wherein if both the first and the second control performance standards correction values are in the same direction, controlling the power system according to a larger of the first and the second control performance standard correction values, wherein if the first and the second control performance standard values are in opposite directions controlling the power system according to the second control performance standard correction value.

* * * * *